US008475349B2

(12) United States Patent
Pirtle et al.

(10) Patent No.: US 8,475,349 B2
(45) Date of Patent: Jul. 2, 2013

(54) METHOD FOR FOLDING FILM EDGES

(75) Inventors: Shaun Eugene Pirtle, Coweta, OK (US); Khurrum Shamsi, Tulsa, OK (US); Robert Earl Cochlin, Chouteau, OK (US)

(73) Assignee: Paragon Films, Inc., Broken Arrow, OK (US)

( * ) Notice: Subject to any disclaimer, the term of this patent is extended or adjusted under 35 U.S.C. 154(b) by 0 days.

(21) Appl. No.: 13/490,974

(22) Filed: Jun. 7, 2012

(65) Prior Publication Data

US 2013/0059715 A1 Mar. 7, 2013

Related U.S. Application Data

(62) Division of application No. 12/470,238, filed on May 21, 2009, now Pat. No. 8,221,298.

(60) Provisional application No. 61/082,398, filed on Jul. 21, 2008.

(51) Int. Cl.
*B32B 3/04* (2006.01)

(52) U.S. Cl.
USPC .......................................... 493/360; 493/356

(58) Field of Classification Search
USPC .................. 493/356–360, 455, 459, 460, 461
See application file for complete search history.

(56) References Cited

U.S. PATENT DOCUMENTS

| | | | | |
|---|---|---|---|---|
| 1,843,087 A | | 1/1932 | Luitwieler | |
| 2,128,664 A | * | 8/1938 | Sackner et al. | 139/1 R |
| 2,897,729 A | | 8/1959 | Ashton et al. | |
| 3,058,402 A | * | 10/1962 | Kugler | 493/196 |
| 3,399,096 A | | 8/1968 | Ranger | |
| 3,978,191 A | | 8/1976 | Allen et al. | |
| 4,905,451 A | | 3/1990 | Jaconelli et al. | |
| 4,932,932 A | | 6/1990 | Schmidt et al. | |
| 5,013,595 A | | 5/1991 | Parry | |
| 5,246,416 A | * | 9/1993 | Demura et al. | 493/439 |
| 5,417,382 A | | 5/1995 | Pettijean et al. | |
| 5,458,841 A | | 10/1995 | Shirrell | |
| 5,520,872 A | | 5/1996 | Scherer | |
| 5,531,393 A | | 7/1996 | Salzsauler et al. | |
| 5,565,222 A | | 10/1996 | Scherer | |
| 5,626,944 A | | 5/1997 | Rasmussen | |
| 5,967,437 A | | 10/1999 | Martin-Cocher et al. | |
| 6,102,313 A | | 8/2000 | Salzsauler et al. | |
| 6,170,772 B1 | | 1/2001 | Martin-Cocher et al. | |
| 6,375,781 B1 | | 4/2002 | Wojcik et al. | |
| 6,394,330 B1 | | 5/2002 | Jackson | |
| 6,592,699 B1 | | 7/2003 | Mehta et al. | |

(Continued)

FOREIGN PATENT DOCUMENTS

| | | |
|---|---|---|
| CA | 2068908 | 11/1993 |
| CA | 2319302 | 4/2001 |
| CA | 2334401 | 8/2001 |

*Primary Examiner* — Hemant M Desai

(74) *Attorney, Agent, or Firm* — Raymond R. Ferrera; Adams and Reese LLP

(57) ABSTRACT

Pre-stretched films may be used to increase the rate at which loads can be wrapped and to minimize the exertion required when using traditional handheld film. However, the edges of pre-stretched films are easily damaged, which may result in tearing or failure of the film during use. The present disclosure describes devices, systems, and methods for folding the edges of the film, resulting in a film that is less susceptible to damage and easier to use.

11 Claims, 4 Drawing Sheets

U.S. PATENT DOCUMENTS

| | | | |
|---|---|---|---|
| 6,713,010 | B1 | 3/2004 | Doran et al. |
| 2004/0048019 | A1 | 3/2004 | Ohlsson |
| 2006/0243842 | A1 | 11/2006 | Saldana Garcia |
| 2006/0289691 | A1 | 12/2006 | Forni |
| 2007/0178278 | A1 | 8/2007 | Clarke |
| 2008/0260305 | A1 * | 10/2008 | Shah et al. .................... 383/211 |
| 2012/0108410 | A1 * | 5/2012 | Perego et al. ................. 493/334 |
| 2013/0059714 | A1 * | 3/2013 | Yamamoto et al. ........... 493/405 |

* cited by examiner

METHOD FOR FOLDING FILM EDGES

CROSS-REFERENCES TO RELATED APPLICATIONS

This application is a divisional application of U.S. patent application Ser. No. 12/470,238, filed May 21, 2009 now U.S. Pat. No. 8,221,298 issued on Jul. 17, 2012, which claims the benefit of U.S. Provisional Patent Application Ser. No. 61/082,398, filed on Jul. 21, 2008, the contents of which are hereby incorporated by reference in their entirety.

FIELD OF THE DISCLOSURE

The present disclosure generally relates to devices, systems, and methods for producing film in-process for use in the stretch film market. In particular, the present disclosure relates to devices, systems, and methods for folding the edges of the film, resulting in a film that is less susceptible to damage and easier to use.

BACKGROUND OF THE DISCLOSURE

Stretch films are widely used in a variety of bundling and packaging applications. For example, stretch films have become a common method of securing bulky loads such as boxes, merchandise, produce, equipment, parts, and other similar items on pallets. Such films are typically made from various polyethylene resins and may be single or multilayer products. An additive known as a cling agent is frequently used to ensure that adjacent layers of film will cling to each other.

An issue with conventional stretch films is that the edges of the film can be easily damaged, which may result in tearing or failure of the film during use. Typically, the edges of the film are prepared by transversely slitting individual roll widths of film from a wider width of film by means of a conventional sharp edge slitter assembly. Any defects that are introduced into the edges of the film during the slitting process can result in film failure during the application process. Dropping the film roll or any other abuse during handling may also create zones of weakness or tears in the edges of the film.

One method of reinforcing the edges of the film is to fold the edges of the material to form a hem. For example, U.S. Pat. No. 5,565,222 discloses an apparatus for hemming the edges of stretch film. The apparatus consists of a first hemming roller with a width less than the width of the film, guide bars located adjacent to the film's path of travel, and a second hemming roller. As another example, U.S. Pat. No. 5,531,393 discloses a film with folded edges. Folding occurs before the film is stretched and is achieved by means of folding fingers that project inwardly from the side plates of the apparatus.

As can be seen, edge folds make the film easier to use and reduce waste by making the film less susceptible to failure due to tears, rough handling, or excessive stretching. However, current methods provide for edge folding in a separate and secondary process after the film has been produced, which increases the time and costs of film production. Thus, there is a need for methods, systems, and devices which can efficiently fold the edges of the film in-process. There is also a need for methods, systems, and devices that can simultaneously fold each edge of multiple widths of film that have been cut from a wider width of film. Finally, there is also a need for methods, systems, and devices that can re-introduce a fold without operator intervention if the fold is lost due to defects in the film.

SUMMARY OF THE DISCLOSURE

An apparatus for folding the edges of a film during the production process is provided. The apparatus comprises a first idler roll, a second idler roll, and a plurality of folding guide assemblies located between the first idler roll and the second idler roll. The apparatus may include a nip roll assembly to produce edge folds that are flat.

A method for folding the edges of a film during the production process is further provided. The method comprises the steps of providing a film with edges created by longitudinal slits, a first idler roll, a second idler roll, and a plurality of folding guide assemblies. The folding guide assemblies are placed between the first idler roll and the second idler roll. The film moves over the first idler roll, through the folding guide assemblies, and over the second idler roll. The method may include passing the film through a nip roll assembly to produce edge folds that are flat.

A film with folded edges produced by the apparatus and method described above is further provided.

These and other features, aspects, and advantages of the present disclosure will become better understood with reference to the following drawings, description, and claims.

BRIEF DESCRIPTION OF THE DRAWINGS

The disclosure will be better understood from the following description and the accompanying drawings given as non-limiting examples, and in which.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the present disclosure is best defined by the appended claims.

Broadly, the current disclosure includes systems, devices, and methods for producing film in-process for use in the stretch film market. More specifically, according to an embodiment of the disclosure, an apparatus and method are provided for folding the edges of a film in-process. The apparatus and method may allow for edge folds on each side of a single width of film. Alternatively, the apparatus and method may allow for edge folds on each side of multiple widths of film that have been cut from a wider width of film, thus allowing multiple film rolls to be simultaneously formed from a single wider sheet of film during production. Edge folds may increase the ease of use and reduce waste by making the film less susceptible to failure due to tears, rough handling, or excessive stretching.

Figure 1:
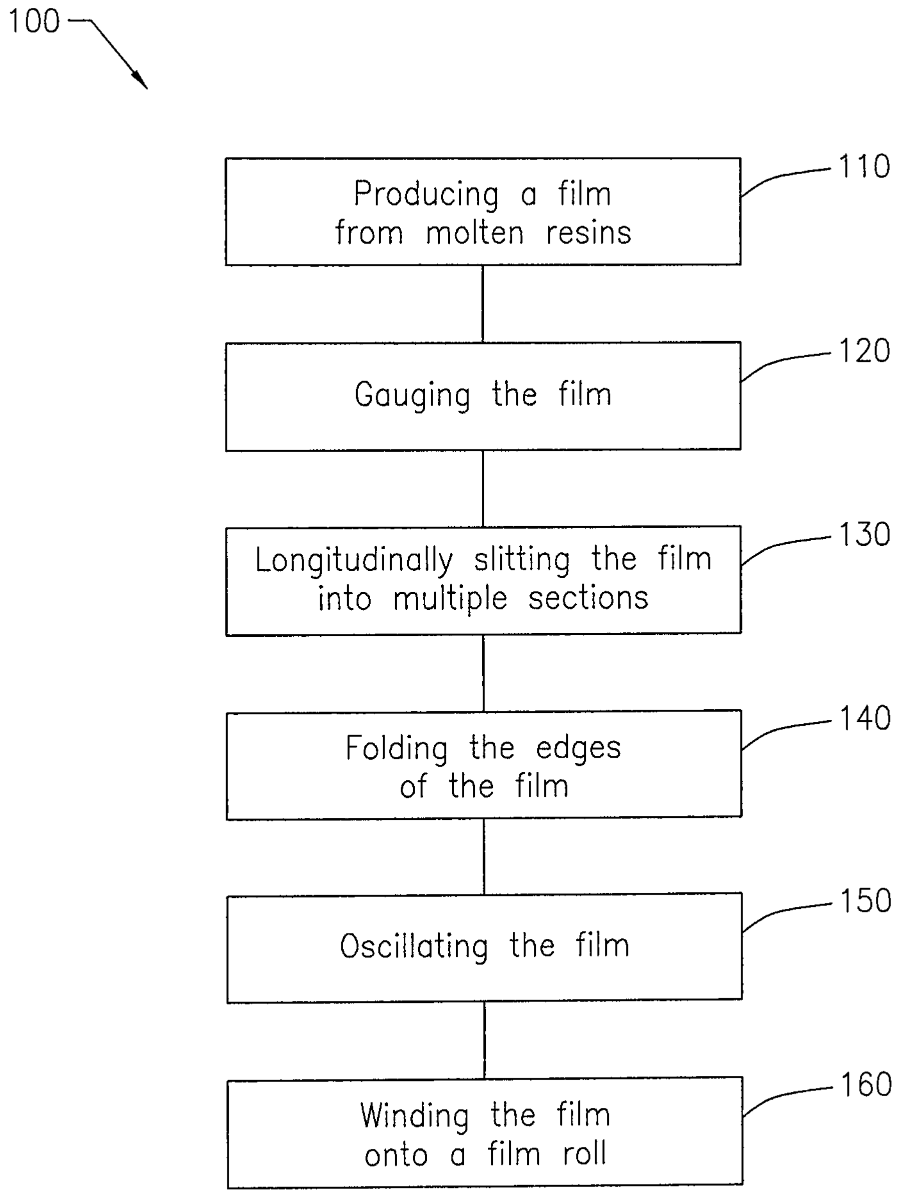
FIG. 1 illustrates the steps for producing film in-process according to an embodiment disclosed herein.

Referring generally to FIG. 1, the steps 100 for producing cast film in-process, according to an embodiment of the present disclosure, are illustrated. Specifically, the steps comprise producing a film from molten resins 110, gauging the film 120, longitudinally slitting the film into multiple sections 130, folding the edges of the film 140, oscillating the film 150, and winding the film onto a film roll 160 in a manner that prevents stacking of the edge folds and entraps air between the layers of film. All of the steps may be performed in-process along a single production line. The steps may be performed in a different order, and one or more steps may be eliminated without departing from the scope of the present disclosure.

Slitting assemblies are well-known in the field, and the present disclosure may use any conventional slitting assembly to slit the film into multiple sections. An interior slit may be defined as a slit made somewhere within the original width of film, resulting in multiple sections of lesser width. Each interior slit may require only one folding guide assembly to accommodate both adjacent film edges. An exterior slit may be defined as a slit made along one of the edges of the original width of film. Each exterior edge may require a separate folding guide assembly.

As shown in FIG. 1, the edges of the film may be folded immediately after the film is longitudinally slit into multiple sections. The edge folds may make the film less susceptible to failure due to tears, rough handling, dropping, or excessive stretching. Thus, the ability to introduce and maintain edge folds is a key component of film performance.

Figure 2:
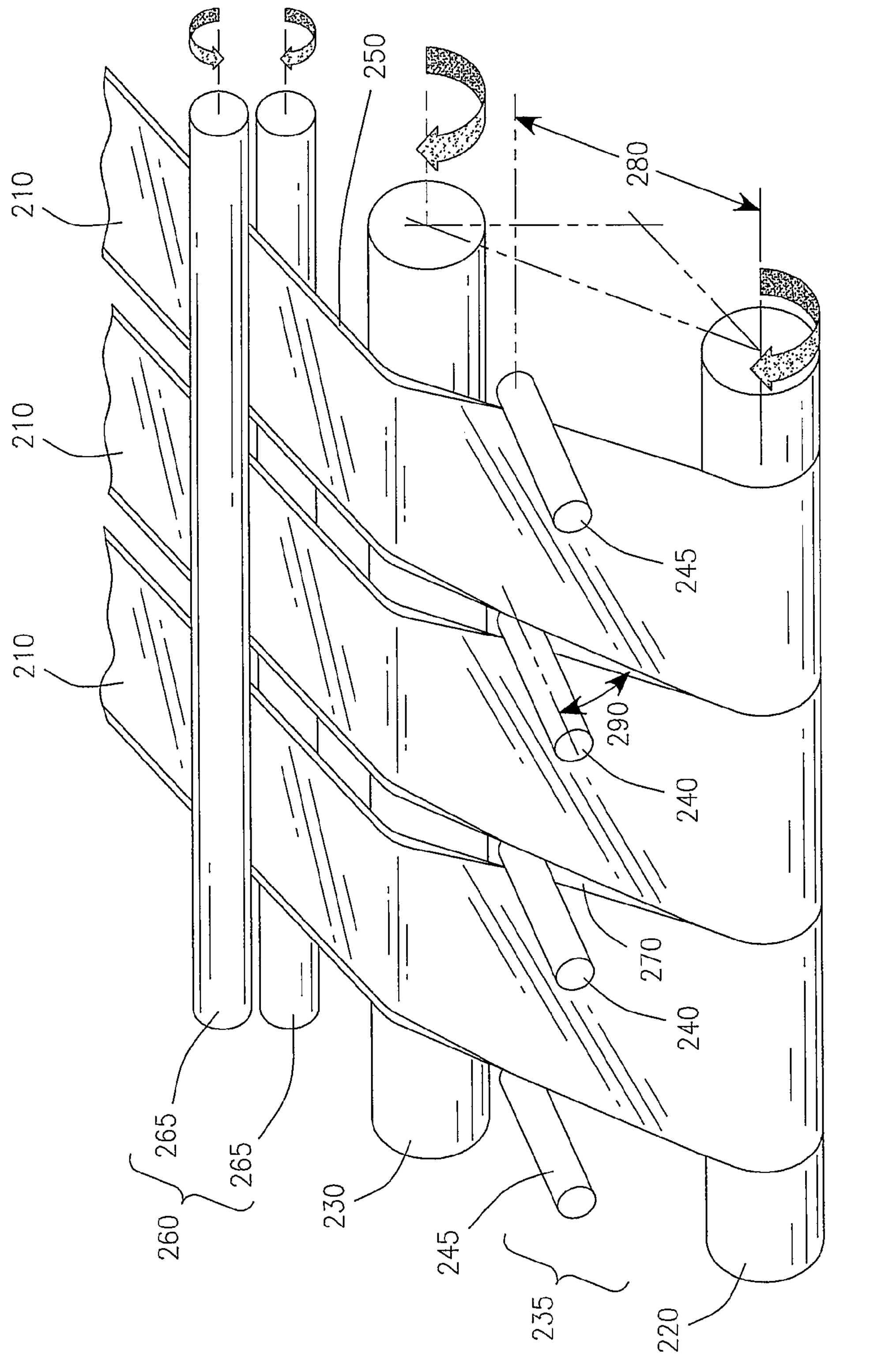
FIG. 2 illustrates the edge folding apparatus and folding guide assembly, with the folding guide assembly comprised of folding rods, according to an embodiment disclosed herein.

As shown in FIG. 2, the means for folding the edges of the film 210 comprises a first idler roll 220, a second idler roll 230, and a plurality of folding guide assemblies 235 also known as folding guides, placed between the first idler roll 220 and the second idler roll 230. Each folding guide assembly 235 may be comprised of steel, aluminum, nylon, or any other material of sufficient modulus to be able to maintain rigidity with no one material demonstrating an advantage. Each folding guide assembly may also have a coefficient of friction that allows the edge of the film to turn back on itself, thus introducing a fold. The diameter and placement of the folding guide assemblies 235 may be key factors in achieving and maintaining edge folds 250 without roping or wrinkling of the film 210.

The folding guide assemblies 235 may be comprised of a plurality of folding rods 240-245, which may be placed in the slits 270 between sections of film 210 to separate the sections of film 210. After the sections of film 210 are separated, the cling agent and the tension of the film 210 may cause the edge folds 250 to form spontaneously. Each interior folding rod 240 may produce two edge folds 250, while each exterior folding rod 245 may produce one edge fold 250.

The folding rods 240-245 may vary from ⅜ inch to 1 inch in diameter, with a preferred diameter of approximately 11/16 inch. The folding rods 240-245 may have uniform diameter throughout their length. As an alternative, the portions of the folding rods 240-245 that contact the film 210 may have a smaller diameter or narrow to a point to further aid in separating the sections of film 210.

The folding rods 240-245 may be placed in the slits 270 between sections of the film 210 at a guide distance 280 and a guide angle 290. The guide distance 280 may be approximately ⅔ of the distance between the first idler roll 220 and the second idler roll 230, as measured from the point where the film 210 leaves the first idler roll 220 to the point where the film 210 first contacts the folding rods 240-245. The guide angle 290 between the film 210 and the folding rods 240-245, measured with the folding rods 240-245 leaning toward the first idler roll 220, may vary from 20° to 90°, with a preferred angle of approximately 45°.

Figure 3:
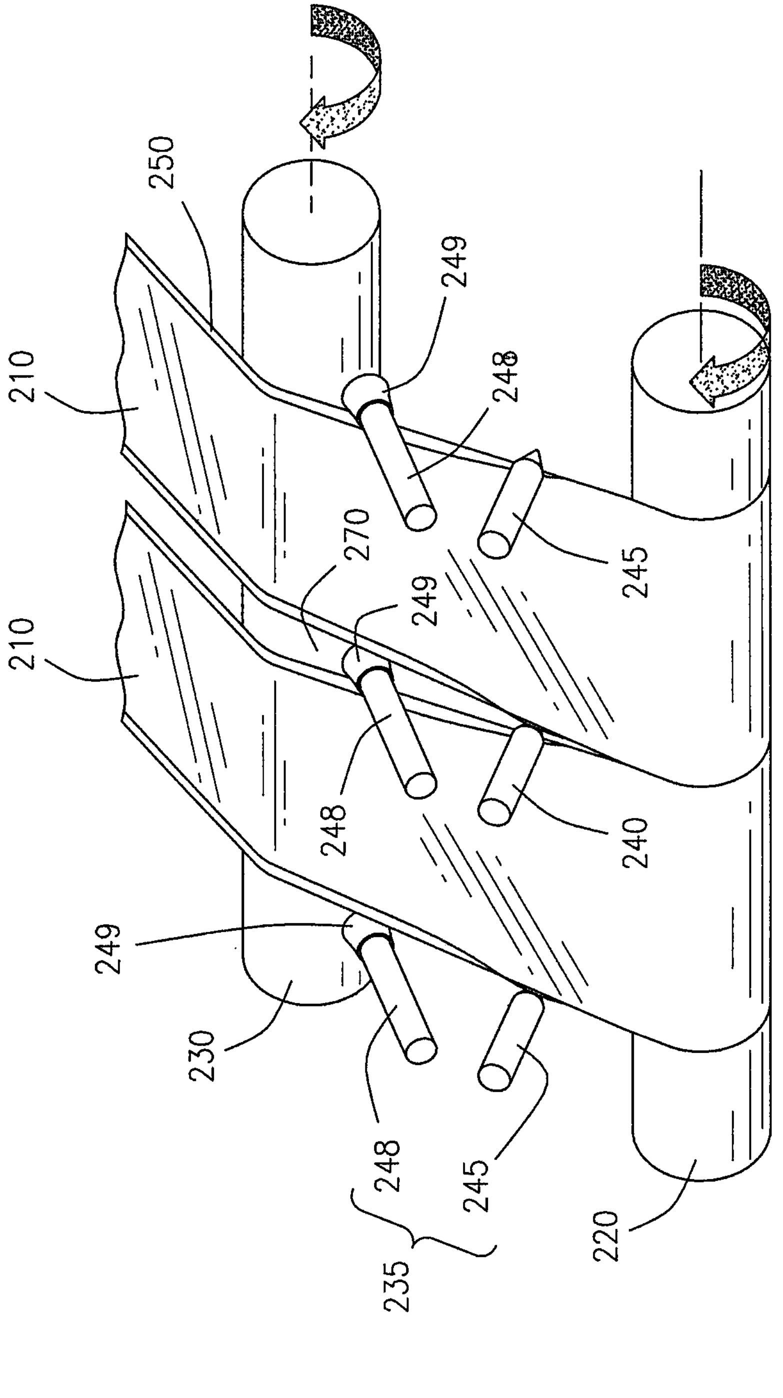
FIG. 3 illustrates the folding guide assembly, with the folding guide assembly comprised of folding rods and re-folders, according to an embodiment disclosed herein.

As shown in FIG. 3, the folding guide assemblies 235 may also be comprised of a plurality of folding rods 240-245 and a plurality of re-folders 248. Each folding rod 240-245 and each re-folder 248 may be separate units that can be positioned independently. Alternatively, each folding rod 240-245 and each re-folder 248 may be combined into a single unit. If the folding rod 240-245 and re-folder 248 are combined into a single unit, their positions may be fixed or adjustable relative to each other.

The re-folders 248 may be placed in the slits 270 between sections of the film 210 after the folding rods 240-245 and before the second idler roll 230. The re-folders 248 may function to further separate the sections of film 210 and to direct the film 210 back onto itself at an angle that aids in re-establishing folds 250 that are lost during the production process. Causes of lost folds 250 include, but are not limited to, holes, gels, contaminated resins, flaws in the film, and other production problems.

The composition and diameter of the re-folders 248 may be comparable to that of the folding rods 240-245. The re-folders 248 may have uniform diameter throughout their length. However, as shown in FIG. 3, the portions 249 of the re-folders 248 that contact the film 210 may be wider than the other portions of the re-folders 248 in order to increase the amount of separation between adjacent sections of the film 210. For example, the portions 249 of the re-folders 248 that contact the film 210 may be capped by an inverted cone or sphere.

Figure 4:
FIG. 4 illustrates an edge fold wherein the film is passed through the edge folding apparatus and a nip roll assembly, according to an embodiment disclosed herein.
Figure 5:
FIG. 5 illustrates an edge fold wherein the film is passed through the edge folding apparatus without the nip roll assembly, according to an embodiment disclosed herein.

As shown in FIG. 2, the means for folding the edges of the film 210 may also comprise a nip roll assembly 260. The nip roll assembly 260 may consist of two rollers 265 pressed together, and may be primarily intended to control the tension of the film 210 as it passes through the slitting assembly and the edge folding apparatus. The nip roll assembly 260 may also aid in pressing the folds 250 into the film 210, resulting in flat edge folds as shown in FIG. 4. If the nip roll assembly 260 is not employed, air entrapment may occur within the edge folds as shown in FIG. 5. Air entrapment within the edge folds may result in a film roll with a different appearance and functionality, much like having bubble wrap on the ends of the roll.

As shown in FIG. 1, the film may be oscillated and wound onto film rolls once the film's edges are folded. Oscillation may efficiently distribute the edge folds onto the film roll. In addition, air may be entrapped between the layers of film as the film is wound onto a film roll, making the film easier to unwind and less susceptible to damage.

From the foregoing, it will be understood by persons skilled in the art that devices, systems, and methods for folding the edges of the film have been provided, resulting in a film that is less susceptible to damage and easier to use. While the description contains many specifics, these should not be construed as limitations on the scope of the present disclosure, but rather as an exemplification of the preferred embodiments thereof. The foregoing is considered as illustrative only of the principles of the present disclosure. Further, because numerous modifications and changes will readily occur to those skilled in the art, it is not desired to limit the present disclosure to the exact methodology shown and described, and accordingly all suitable modifications and equivalents may be resorted to, falling within the scope of the present disclosure. Although this disclosure has been described in its preferred form with a certain degree of particularity, it is understood that the present disclosure of the preferred form has been made only by way of example and numerous changes in the details of the method may be resorted to without departing from the spirit and scope of the present disclosure.

What is claimed is:

1. A method for producing folded edges in a film in-process, the method comprising the steps of providing a film section with edges created by longitudinal slits;

providing a first idler roll;

providing a second idler roll separated from the first idler roll by a first distance;

providing a plurality of folding guides that are positioned between the first idler roll and the second idler roll;

moving the film section over the first idler roll;

moving the film section past the folding guides, wherein each folding guide separates adjacent sections of film and induces two folds by causing an edge of each section of film to turn under 180° and spontaneously cling to a bottom surface of the film; and moving the film section over the second idler roll.

2. The method according to claim 1, wherein the folding guide is a folding rod.

3. The method according to claim 2, wherein the folding rod varies from 3/8 inch to 1 inch in diameter.

4. The method according to claim 3, wherein the folding rod is approximately 11/16 inch in diameter.

5. The method according to claim 1, wherein the folding guide is positioned between the first idler roll and the second idler roll at a guide distance and a guide angle.

6. The method according to claim 5, wherein the guide distance is approximately 2/3 of the first distance.

7. The method according to claim 5, wherein the guide angle is an acute angle between the film and the folding rods, measured with the folding rods leaning toward the first idler roll.

8. The method according to claim 7, wherein the guide angle varies from 20° to 90°.

9. The method according to claim 8, wherein the guide angle is approximately 45°.

10. The method according to claim 1, wherein the film passes through a nip roll assembly after the second idler roll.

11. The method according to claim 1, wherein the folding guide is comprised of a material selected from a group consisting of steel, aluminum, and nylon.

* * * * *